United States Patent
Putzolu et al.

(10) Patent No.: US 6,681,243 B1
(45) Date of Patent: Jan. 20, 2004

(54) NETWORK ENVIRONMENT SUPPORTING MOBILE AGENTS WITH PERMISSIONED ACCESS TO RESOURCES

(75) Inventors: David M. Putzolu, Forest Grove, OR (US); Sanjay Bakshi, Hillsboro, OR (US); Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/361,921

(22) Filed: Jul. 27, 1999

(51) Int. Cl.$^7$ .............................................. G06F 15/16

(52) U.S. Cl. .................. 709/202; 709/206; 709/217; 709/300; 709/317

(58) Field of Search ................................. 709/202, 206, 709/217, 300, 317; 707/4, 10, 100, 101, 102, 103

(56) References Cited

U.S. PATENT DOCUMENTS

| | | | | |
|---|---|---|---|---|
| 6,049,819 A | * | 4/2000 | Buckle et al. | 709/202 |
| 6,055,562 A | * | 4/2000 | Devarakonda et al. | 709/202 |
| 6,115,736 A | * | 9/2000 | Devarakonda et al. | 709/202 |
| 6,119,230 A | * | 9/2000 | Carter | 713/200 |
| 6,122,664 A | * | 9/2000 | Boukobza et al. | 709/224 |
| 6,134,580 A | * | 10/2000 | Tahara et al. | 709/202 |
| 6,163,794 A | * | 12/2000 | Lange et al. | 709/202 |
| 6,170,065 B1 | * | 1/2001 | Kobata et al. | 714/7 |
| 6,189,103 B1 | * | 2/2001 | Nevarez et al. | 713/201 |
| 6,282,563 B1 | * | 8/2001 | Yamamoto et al. | 709/202 |
| 6,434,619 B1 | * | 8/2002 | Lim et al. | 709/229 |
| 6,502,131 B1 | * | 12/2002 | Vaid et al. | 709/224 |
| 6,519,594 B1 | * | 2/2003 | Li | 707/10 |
| 6,539,425 B1 | * | 3/2003 | Stevens et al. | 709/220 |

OTHER PUBLICATIONS

Nicklisch et al., "INCA: An Agent–Based Network Control Architecture", second International Workshop, IATA 98 Proceedings, Jul. 4–7, 1998.*

Hansoty et al., "JAVA: Secure Delegation of Mobile Applets", IEEE Workshops, pp. 242–247, Jun. 18–20, 1997.*

ObjectSpace: Voyager Press Releases, *ObjectSpace, Inc. Announces Voyager™, The World's First Platform for Agent–Enhanced Distributed Computing in Java™*, http:www.objectspace.com/company/vgrpress. Apr. 2, 1997, pp. 1–4.

Mitsuru Oshima, Guenter Karoth and Kouichi Ono, *Aglets Specification 1.1 Draft*, Sep. 8, 1998, http://www.trl.ibm.co.jp/aglets/spec11.html, , pp. 1–43.

Danny B. Lange. IBM Tokyo Rearch Laboratory, *Java Aglet Application Programming Interface (J–AAPI) White Paper—Draft 2*. http://www.trl.ibm.com.jp/aglets, Feb. 19, 1997, pp. 1–6.

IBM Co., *Aglets Software Development Kit—About Aglets* (visted Jul. 26, 1999), http://www.trl.ibm.co.jp/aglets/about.html, pp. 1–2.

ObjectSpace, *Voyager Core Technology Version 2.0 Now Available* (visited Jan. 12, 1999) http:www.objectspace.com/products/voyager/core/index.html, pp. 1–8.

Susilo G et al: *Infrastructure for Advanced Network Management Based on Mobile Code*, IEEE Network Operations and Management Symposium, US, New York, NY: IEEE, vol. Conf. 10, Feb. 15, 1998, pp. 322–333.

(List continued on next page.)

Primary Examiner—Saleh Najjar
(74) Attorney, Agent, or Firm—Kenyon & Kenyon

(57) ABSTRACT

A method and system are disclosed for providing an environment allowing agents to function on a set of devices having resources, the environment providing services allowing agents access to resources. Each agent has an associated permission list indicating which services the agent may access. Each agent may move from an environment on one device on a network to an environment on another device.

22 Claims, 8 Drawing Sheets-

OTHER PUBLICATIONS

Zhang D et al: *Developing network management applications in an application–oriented way using mobile agent*, Computer Network and ISDN Systems, NL, North Holland Publishing, Amsterdam, vol. 30, No. 16–18,Sep. 30, 1998, pp. 1551–1557.

Liotta A et al: *Modelling Network and System Monitoring Over the Internet with Mobile Agents*, IEEE Network Operations and Management Symposium, US, New York, NY: IEEE, vol. Conf. 10, Feb. 15, 1998, pp. 303–312.

Grimm R et al: *Security policies in OSI–management experiences from the DeTeBerkom project BMSec*, Computer Networks and ISDN Systems, NL, North Holland Publishing, Amsterdam, vol. 28, No. 4, Feb. 1, 1996.

Nicklisch et al., "INCA: an agent–based network control architecture", second international workshop, IATA 98 proceedings, Jul. 4–7, 1998, all pages.

Hansoty et al., "JAVA: secure delegation on mobile applets", IEEE workshops, Jun. 18–20, 1997, pp. 242–247.

Susilo., "Infrastructure for Advanced Network Management Based on Mobile Code", IEEE Network Operations and Management Symposium, US, New York NY: IEEE vol. Conf. 10, Feb. 15, 1998, pp. 322–333, XP000799502 ISBN: 0–7803–4352–2, whole document.

Zhang et al., "Developing network management applications in an application–oriented way using mobile agent", Computer Networks and ISDN Systems, NL, North Holland Publishing, Amsterdam, vol. 30, No. 16–18, Sep. 30, 1998, pp. 1551–1557, XP004138686, ISSN: 0169–7552, whole document.

Liotta et al., "Modelling Network and System Monitoring Over the Internet with Mobile Agents", IEEE Network Operations and Management Symposium, US, New York, NY: IEEE, vol. CONF. 10, Feb. 15, 1998, pp. 303–312, XP000799500, ISBN: 0–7803–4352–2, whole document.

Grimm, et al., "Security policies in OSI–management experiences from the DeTeBerkom project BMSec", Computer Networks and ISDN Systems, NL, North Holland Publishing, Amsterdam. vol. 28, No. 4, Feb. 1, 1996, psrd 599–622, XP005003983, ISSN: 0169–7552, whole document.

\* cited by examiner

NETWORK ENVIRONMENT SUPPORTING MOBILE AGENTS WITH PERMISSIONED ACCESS TO RESOURCES

BACKGROUND OF THE INVENTION

I. Field of the Invention

This invention relates to computer systems, in particular to network environments.

II. Background Information

Organizations use networks such as local area networks or wide area networks to share information and capabilities among devices and to allow users to communicate and exchange information. Such networks consist of numerous devices connected by links. Each device may perform various functions; for example a PC may at the same time run user applications and act as a network management console. As networks grow and the complexity of networks increase, managing networks becomes more difficult. When used herein, device may refer to any physical node in a network. For example, a device may be a PC, a workstation or a laptop running a user application programs, a router, an application gateway, a server, or any other device attached at some point in time to a network.

Traditional network management methods rely on centralized control using a limited number of management consoles—this has numerous drawbacks. Control and modification of network functionality and of user and network applications, is inflexible and time consuming. A human operator must visit a physical device to add, move, or alter an application, and each device must be dealt with differently.

Network administration requires knowledge of the state of the network—information on the state and activities of specific devices and links. Currently, the distributed state of the network is determined at a management console indirectly through network device polling. The network state is not always accurately viewed from one central point. Inherent in networks is the unreliability of links; data may be delayed or lost and devices may be isolated due to link failures. Transmitting network state information between management consoles and other devices may range from difficult (e.g., when there is excess traffic), to impossible (e.g., when a device becomes isolated due to a link failure). State information is gathered more efficiently, quickly, and accurately at or near a device, rather than at a centralized command console. Tools for accurately gathering the distributed state of a network and possibly reporting to a central console do not exist; current systems are particularly deficient during network failures.

Furthermore, network management using centralized administration which reacts to state information from a distant command console and directs commands to a device is inefficient and inaccurate. Network administration information, such as commands, must traverse links to reach destinations, and thus suffers from the same transmission faults as network state information. Thus current network management systems, relying on centralized management, may not reliably transmit control information to devices. While a network is experiencing a disruption in its operation, e.g., a link failure, an abnormal amount of traffic, or an attack on the network, the above disadvantages are magnified. Adequate tools for distributed network management, which may alleviate problems inherent in centralized network management, do not exist.

That current networks concentrate so much management responsibility in a small number of locations increases their vulnerability. Management consoles may become isolated or may fail, with the result that the network may be unmanageable. In addition, current network management systems lack the tools to manage devices which are purposefully disconnected from a network for a period of time, such as laptop computers.

Another drawback of current network systems is the inflexibility of the applications using and controlling the network. Networks applications (e.g., a web server application, or router software) or other applications, such as word processors, are typically static packages installed by a person who visits the host device (i.e., the platform supporting the application) and configures the device. To add an application (e.g., to install a router on a device), reconfigure an application (e.g., add functionality) or to move the application among devices, a person must physically visit the affected devices. In current networks, applications cannot move by themselves, and the functionality of network devices must be altered by having an operator physically access the device and install, alter or upgrade an application. Current systems do not enable the addition or alteration of the functionality of a network device through remote methods, or from a central location. That applications cannot be easily added or moved makes inefficient use of network resources. For example, since it may be time consuming to install a router application at a device, currently it is not common practice to temporarily install such an application and then de-install it, freeing up resources, when the need for the application vanishes. No method exists for a version of a module with new functionality or a new application to be deployed to a diversity of devices and platforms. Furthermore, since platforms provide different interfaces to applications, current systems require that a different implementation of an application must be installed on each type of platform.

Mobile agent environments exist which allow an agent, a mobile software application, to execute on various devices on a network, to travel between devices on a network, and to maintain its state during its travels. One example is the Voyager™ system, which allows agents developed in the Java™ language to execute on a Java™ Virtual Machine running on a device. Such systems may not be used for effective network management, however, as such systems do not allow agents to effectively and safely access resources, such as router tables, network traffic, network statistics, etc., necessary for network management. An application or agent participating in network management must have access to system resources. Similarly, since such systems do not allow effective access to resources, agents on such systems may not be used to augment device functionality, and may not be used as network or user applications. Such systems lack permissioning which would allow prior art agents to access resources in a manner which is tailored to each agent. Such systems lack the ability to circumscribe and limit prior art agents' access to resources. Furthermore, since agents may not access a service across devices in a simple, device independent manner, such systems lack the ability to provide services or capabilities to agents on a wide variety of devices. Current systems do not allow agents to access resources which may exist on devices different from that on which the agent operates in a safe and controlled manner. Therefore, agents may not manipulate or manage remote devices.

Therefore there exists a need for a system and method allowing for network management functions to be decentralized and located closer to managed devices. There is a need for a system and method allowing effective network management tools or applications to move among devices on a network or to be augmented or reconfigured, without an operator physically accessing devices. There is a need for applications to have access to resources on a variety of devices in a device independent manner which ensures network security. There exists a need for a system allowing new functionality or applications to be deployed to network devices from a central location, without regard for the type of platform or device receiving the module.

SUMMARY OF THE INVENTION

A method and system are disclosed for providing an environment allowing agents to function on a set of devices having resources, the environment providing services allowing agents access to resources. Each agent has an associated permission list indicating which services the agent may access. Each agent may move from an environment on one device on a network to an environment on another device.

DETAILED DESCRIPTION

I. Overview

Figure 1:
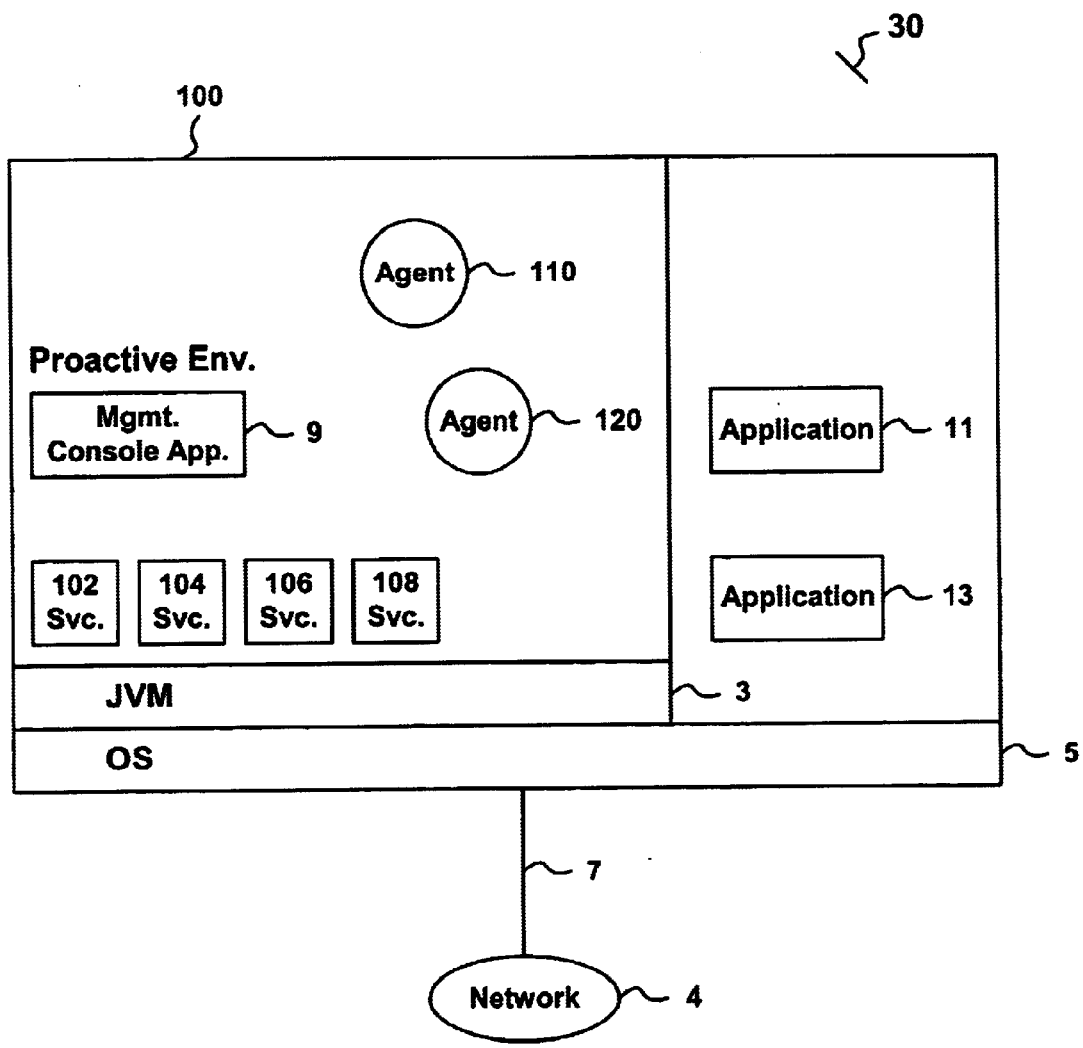
FIG. 1 is a block diagram illustrating a computer system according to an embodiment of the present invention.

The system and method of the present invention allow for easier and more effective management of a network and of the applications existing on the devices on the network, easier customization and deployment of applications and of the functionality of devices, and better use of network resources through the dynamic allocation of applications and functionality. An exemplary embodiment of the present invention achieves this by providing an environment allowing mobile agents to perform network management functions, to alter or augment device functionality, and to act as network or user applications, in a manner maintaining network security. Agents are software objects which may execute on a device or environment, move to another device or operating environment, and resume execution. Mobile software agents can be created to act as, for example, a user application such as a word processor or a network application such as a router. Agents may be configured to alter network functionality by, for example, altering routes on a router or to diagnose abnormal network conditions. Agents can travel throughout the network from device to device and are given the ability to access resources. Rogue agents, which may access network or device resources for destructive ends, are prevented from operating, as permissioning is provided. Network management may be achieved using distributed agents, possibly communicating with a central controller. While the system and method of the present invention is described as aiding functions such as network management and application deployment, other benefits may be realized without departing from overall operation of the invention.

When used herein, an agent is a software component having the capability to move from device to device on a network and to execute on the devices it moves to. An agent may require a certain platform to execute and may not be able to execute on every device on a network; in an exemplary embodiment of the present invention agents require a proactive environment, an agent enabling environment, to operate. In an exemplary embodiment an agent may be, for example, a routine which alters the routing table on a router, a routing application which provides actual routing functionality at a device, a server, such as a web server application, an application functioning to diagnose, report on, or correct network conditions, or a user application, such as a word processor. While certain uses and functions for agents are described, the agents of the system and method of the present invention may have other uses and functions.

An exemplary embodiment of the present invention provides for a proactive environment, which allows mobile agents to execute on network devices and access device and network resources in a controlled and secure manner. A proactive environment exists on multiple devices in a network; one proactive environment exists on each device which may support a proactive environment. Each proactive environment can create agents (and is thus the agents' "launch point"), provides a platform allowing agents to run, allows access to resources through services, monitors and controls agents, allows agents to travel across the network to other proactive environments, may receive agents moving from other proactive environments, and in addition may perform other network administration functions. A proactive environment enables an agent to execute on one device, stop execution, transfer to another device, and resume execution. Alternate embodiments may allow a proactive environment to perform a different set of functions. For example, in an alternate embodiment a proactive environment may not be responsible for creating agents.

An exemplary embodiment of the system and method of the present invention allows agents to access resources (such as a routing table, a disk drive, or the ability to run a machine code program) only if the agents have permission to do so. Services are used to allow agents restricted access to resources by acting as intermediaries between the agents and the underlying resources. Services may allow access to resources or may emulate the function of resources. For example, a service altering a routing table may accept the routing table entry to be altered. A service may accept and emulate an MS-DOS or machine code program. Security is provided, as agents require permissioning to use services, and services may constrain access to resources. In an exemplary embodiment of the present invention, permissioning is achieved by having each agent carry with it an access control list which is a permission list determining which services it may access, and other security information. Current systems do not provide agents restricted access to network or device resources; agents have either complete or minimal access.

Resources may be any data structure, function, or physical component to which a device allows access. For example, a resource may be the ability to create and alter files; such a resource is normally provided by an operating system. A resource may be a routing table. A resource may be, for example, the ability to send simple network management protocol ("SNMP") messages. A resource may also be the ability to output information to a display (e.g., a CRT or flat panel display), produce sounds, or accept keyboard or pointing device input.

Agents may install themselves on devices to add or alter device functionality, or may reside temporarily at a device. An agent may exist for a relatively long, undefined duration (for example an agent acting as a user application) or may exist for a relatively brief time (for example, an agent diagnosing a network fault). An agent may reside at the same device for the duration of its existence (for example a user application agent) or may move from device to device (for example, an network diagnosis agent). The system and method of the present invention allows an operator to control this activity from a remote terminal, without physically accessing affected devices.

The system and method of the present invention facilitate the quick and easy deployment of new network functionality. A router may require a firewall capability; a system administrator may direct a firewall agent to move to the router, or the router may request such an agent to move. An embodiment of the present invention facilitates accurate monitoring of the network state, as agents may be deployed directly to devices to be monitored (and possibly report back to a central location), and allows monitoring to continue during a network failure. System administration is made more effective and accurate, as data is gathered and commands are issued by mobile agents which are located at or near the device being administered. These benefits are achieved by allowing trusted agents to execute on and monitor, augment or alter the functioning a device. Security risk is minimized as agents are granted only permissioned and circumscribed access to resources. Current systems have no mechanism to ensure that an agent loading on the device does not pose a security risk resulting from malicious or erroneous access to resources. For example, current systems allowing agents to operate cannot guard against an agent using the format command to erase a hard disk drive, either by mistake or deliberately.

In an exemplary embodiment, services may grant access to resource in a device, platform, and application independent manner. Services provide a unified view of resources, in that a service providing access to a type of resource provides one interface to agents, while the underlying resource type may provide greatly varying interfaces. Current systems are inflexible in that agents must access resources on different devices with different interfaces.

The system and method of the present invention facilitate the quick and easy deployment of new application or network functionality, or the modification of applications or functionality, without an operator physically accessing affected devices. For example, an agent which acts as a word processor dictionary can be instantiated by a device and sent via a network to other devices to add functionality to word processing programs. A web server agent may move to a different device to better serve users due to a high traffic or network error condition. A user application or user data set may migrate to follow the actual user, who switches devices. Agents may be modules or components of larger applications. The system and method of the present invention allow for a device to accept such an agent, knowing (via permissioning) the agent does not pose a security risk. In prior art systems, no mechanism existed to ensure an agent loading on the device would not pose a security risk.

Prior art systems did not allow agents to interface with host devices in a device independent manner. Through the services of the system and method of the present invention, a dictionary agent may operate with various word processors or devices without requiring different interface mechanisms for the different systems. Similarly, an agent may be sent to a router to alter the routing table on the router, or a router agent may be sent to a device to add router functionality to that device. The agent needs to use only one interface to communicate with different types of routing software on different devices.

The system and method of the present invention facilitate more accurate monitoring of the network state, in particular during network failures or times of stress on a network. That agents may be deployed to the devices to be monitored, or near such devices, allows for a faster, more accurate, and finer granularity monitoring, and allows monitoring to continue during a network failure. For example, to monitor network traffic, agents may be deployed to devices supporting proactive environments. These agents may monitor network traffic and report their monitoring to the management console application.

The services of an embodiment of the present invention may be circumscribed, or may be tailored based on agent permissioning. For example, an agent which is to diagnose an abnormal network traffic condition may be allowed, per its permissioning, to use an SNMP service to both read to and write from devices. A different agent, which is created only to monitor messages, may be allowed to use the same service only to read from devices. Such circumscribed access to network resources provides more accurate limits on activities of agents which may result in security risks.

II. Proactive Environment

Referring to the figures in which like numbers indicate like elements, FIG. 1 is a block diagram illustrating a network node 30 according to an embodiment of the present invention. Node 30 may be a standard personal computer or another type of data processing device, and in addition, may include components not traditionally found in a standard personal computer. Node 30 is a device connected to a network 4 via network connection 7. Node 30 includes proactive environment 100, which includes services 102, 104, 106 and 108 and which provides an environment on which agents, such as agents 110 and 120, may run. Node 30 includes operating system ("OS") 5, providing overall control of node 30, Java™ virtual machine ("JVM") 3, providing a platform on which proactive environment 100 executes, management console application 9, providing a user interface for monitoring and control of proactive environment 100, agents 110 and 120, services 102–108, and also of agents and services which may exist on nodes which are part of network 4. Node 30 includes applications 11 and 13, providing functionality, such as word processing, to a user. Network 4 provides connectivity and communications with other networks (not shown) and with other network devices (not shown) which may support other proactive environments. Services 102–108 provide agents 110 and 120 access to resources, such as access to network 4, network connection 7, OS 5, or other resources. In alternate embodiments, the system and method of the present invention may work with networks having a structure other than that described.

In an exemplary embodiment of the present invention proactive environment 100 creates agents, provides a platform allowing agents to run, monitors and controls agents, allows agents to travel via network 4 to other proactive environments, may receive agents transmitted from other proactive environments, and in addition may perform other functions. Proactive environment 100 interfaces with a human operator using management console application 9. Proactive environment 100 is a Java™ object which runs on JVM 3, itself a program running on node 30. Proactive environment 100 is implemented as an extension of the Voyager™ system, which defines a Java™ program allowing agents to operate. In alternate embodiments the system and method of the present invention may be implemented using tools other than the Java™ language and the Voyager™ system. For example, the agents and proactive environments may be created using a C++ based system, or a system not having object oriented capability. Furthermore, in alternate embodiments, certain functions may be carried out by modules other than that described without departing from the invention. For example, agents may have inherent service capabilities, in a manner providing network security.

In an exemplary embodiment each device on network 4 supporting a proactive environment has one proactive environment executing on the JVM on that device; however, alternate embodiments may allow for other numbers of proactive environments to function on a device. A proactive environment executing on a device is an instantiated Java™ object, a proactive environment object.

Agents may execute on a proactive environment, halt, move to another proactive environment, and resume operation. In an exemplary embodiment of the present invention each agent is a Java™ object; each such agent object is instantiated by a proactive environment using an agent Java™ class.

When used herein, an agent, a class defining an agent, and instantiation of an agent (an agent object) may be used interchangeably. In an exemplary embodiment when an agent moves to a device it actually moves to the proactive environment supported by the device. Therefore, when used herein, an agent may be referred to as moving to a device or to a proactive environment interchangeably. The objects (such as agents) of alternate embodiments of the present invention may be defined using languages other than Java™ including non-object oriented languages.

In an exemplary embodiment of the present invention proactive environment 100 provides an interface to agents 110 and 120 including services 102–108. Services 102–108 are Java™ classes which may be instantiated as objects which run on the JVM 3; the objects contain methods which accept inputs from agents and allow agents access to resources. Services are members of a proactive environment; services 102–108 are members of proactive environment 100. Agents 110 and 120 may access services 102–108 by requesting proactive environment 100 to instantiate a service object; the agent then may invoke methods of the service object, which are Java™ methods. Services may, if so created, have access to any resource on node 30 or network 4 to which JVM 3 itself has access, e.g., file creation, SNMP messages, routing tables, or display output. When used herein, service may refer to the class defining a service or to an object instantiated based on that service class. Furthermore, an agent accessing or calling a method within a service object may be said to be accessing or calling that service.

Each resource on network 4 accessible by agents is accessible via a type of service. For example, the hard disk drive on each device on network 4 is accessible by a disk service type; different disk services on different devices interface with the various types of disk drives and present a unified interface to agents. Different types of services provide access to underlying resources in a different manner, and interface with agents in a different manner. Each type of service provides a standardized interface to agents and the ability to access a certain resource; different service classes may be used to implement a service type across different platforms. While the actual service class used by an agent to access a service type on each device may be different, an agent using a certain service type across different devices is still considered to be accessing the same service. Therefore, when used herein, an agent accessing an instantiation of a service class may be referred to as accessing a service. Java™ methods capable of accessing device resources, such as a file system or a router table, are well known in the art.

Figure 2:
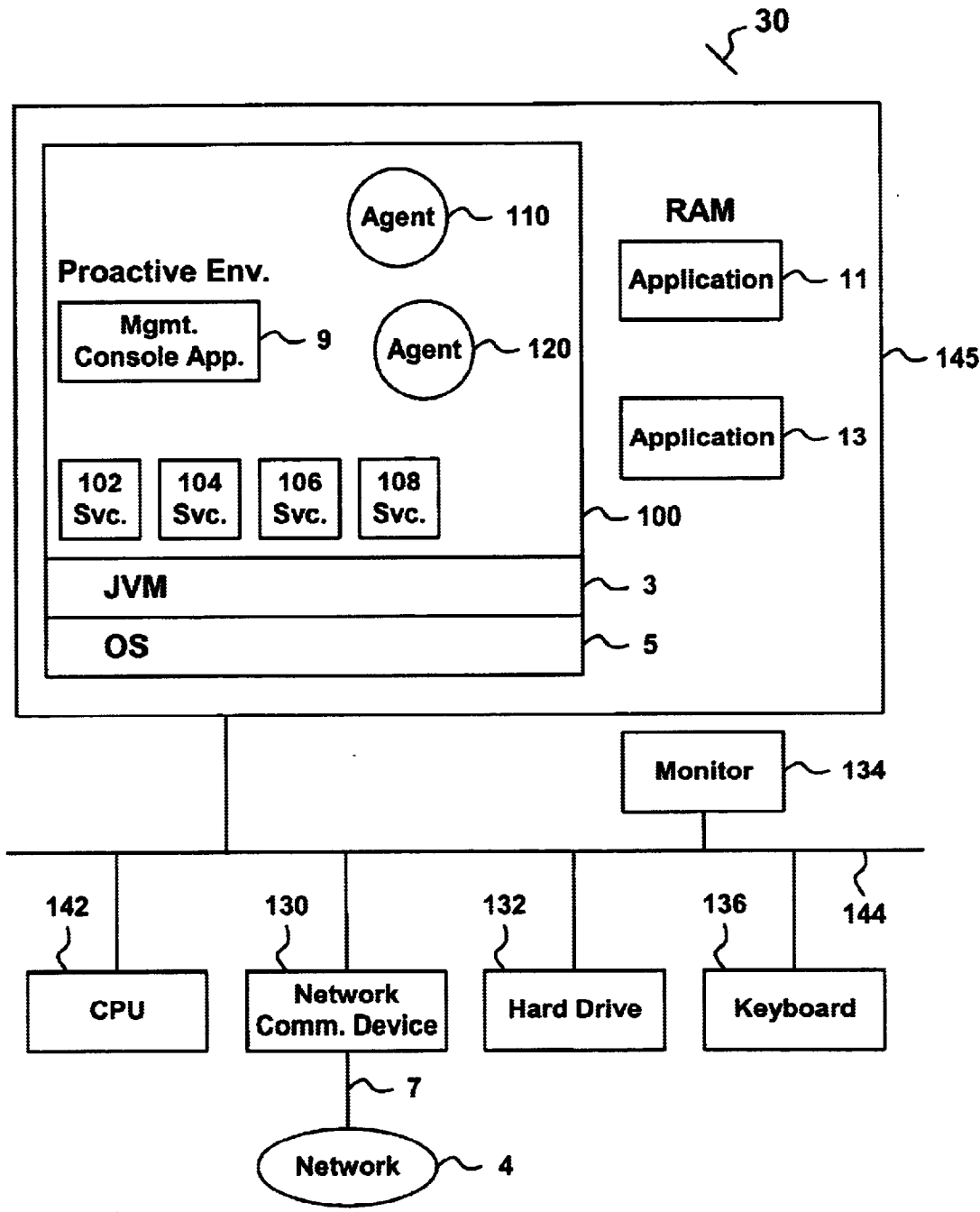
FIG. 2 is a block diagram illustrating the computer system of FIG. 1 according to an embodiment of the present invention.

FIG. 2 is a block diagram illustrating node 30 of FIG. 1 according to an embodiment of the present invention. FIGS. 1 and 2 illustrate node 30 from different aspects; thus like numbered components are identical in function and structure. Node 30 includes a central processing unit ("CPU") 142 connected to a system bus 144. CPU 142 executes instructions and controls the operation of node 30. CPU 142 may be, for example, a Pentium® processor available from Intel® Corp. System bus 144 allows the various components of node 30 to communicate, and may alternatively include a plurality of busses or a combination of busses and bus bridge circuits. Node 30 further includes RAM 145, providing non-permanent storage of data and program instructions, and a plurality of peripheral devices 130, 132, 134, and 136, including keyboard 136, allowing user input, network communications device 130, hard disk drive 132, allowing for long term storage of information, and monitor 134, displaying information to a user. Peripheral devices may include other devices not shown, such as a printer or a mouse. Node 30 includes application programs 11 and 13, proactive environment 100, services 102, 104, 106 and 108, agents 110 and 120, JVM 3, management console application 9, and OS 5. Network communications device 130 allows node 30 to connect to network 4 (and possibly other networks, not shown) via network connection 7. A portion of application programs 11 and 13, proactive environment 100, services 102–108, agents 110 and 120, JVM 3, management console application 9, and OS 5 are stored in RAM 145, are executed by CPU 142, and to an extent control the operation of node 30 in cooperation with other components such as CPU 142. Services 102–108 provide agents 110 and 120 access to resources, such as access to network communications device 130, hard disk drive 132, monitor 134, OS 5, or other resources.

In an exemplary embodiment configuration and control of agents, devices, services, and proactive environments may be accomplished through management console application 9. Management console application 9 allows a human operator to communicate with, monitor, and send commands to proactive environments. A human operator may control certain operations of management console application 9, and other operations may be performed by management console application 9 itself. Management console application 9 may be used to add or remove services at certain proactive environments, and to create, monitor, control, or eliminate agents. In an exemplary embodiment each management console application 9 is a Java™ application running on a JVM which may send messages to proactive environments and agents. A user may input commands to management console application 9 via an input device such as keyboard 136 and receive information from management console application 9 (for example, the status and location of agents operating on network 4) via monitor 134. Other management console applications may exist on other devices connected to network 4. In alternate embodiments, management console applications may not be used, or other methods of controlling proactive environments and agents may be used.

Figure 3:
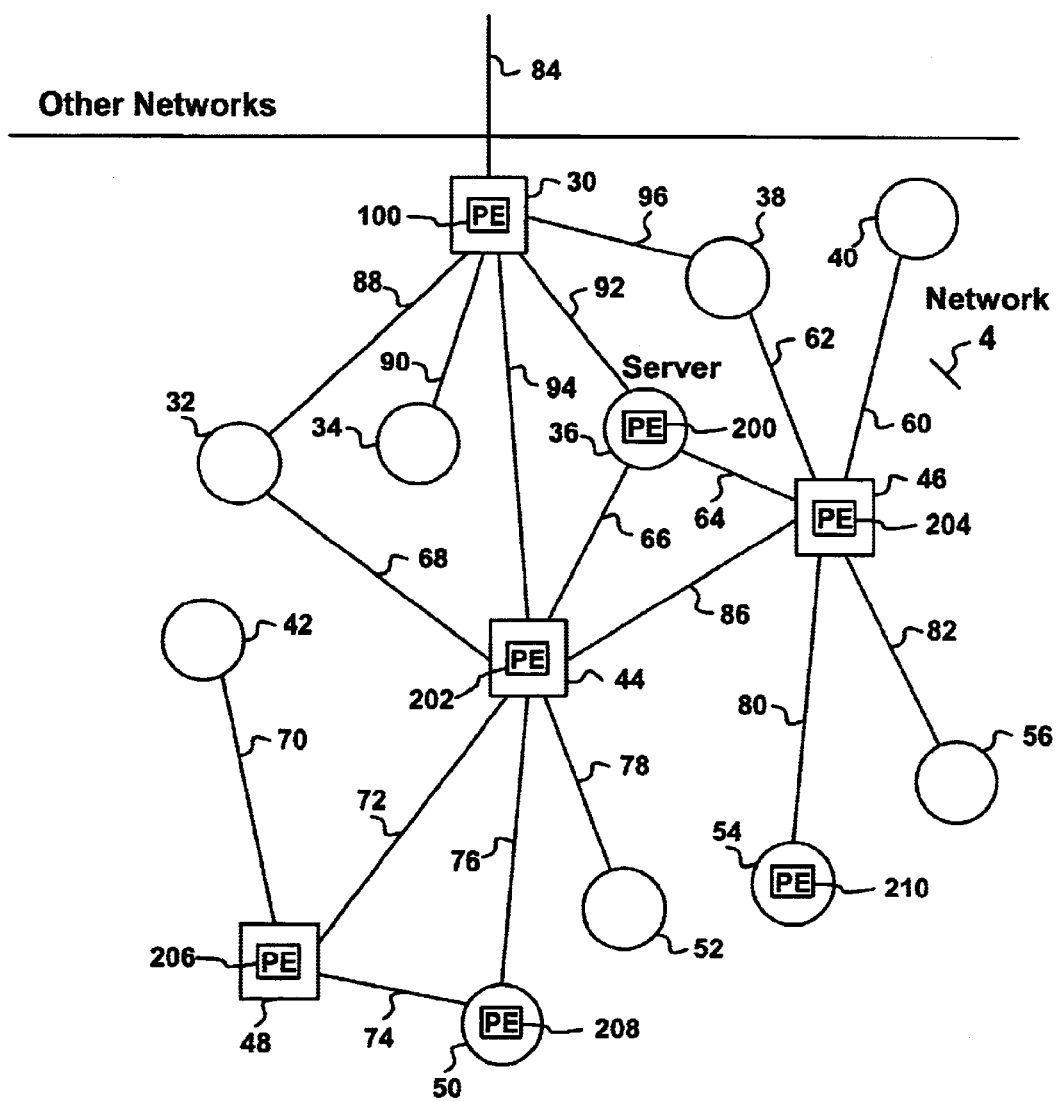
FIG. 3 is a block diagram illustrating the network of FIG. 1 according to an embodiment of the present invention.

FIG. 3 is a block diagram illustrating network 4 of FIG. 1 according to an embodiment of the present invention. In an exemplary embodiment network 4 includes nodes 30, 32, 34, 36, 38, 40, 42, 44, 46, 48, 50, 52, 54 and 56 providing user functionality, routing traffic, providing network security, and performing other functions, and links 60, 62, 64, 66, 68, 70, 72, 74, 76, 78, 80, 82, 84, 86, 88, 90, 92, 94 and 96 connecting and transmitting data between nodes 30–56. Links 60–96 may be, for example, coaxial cable, twisted pair cable, or fiber-optic cable, but can be any transmission medium capable of transporting traffic.

Node 30 is a gateway, providing network 4 access to other networks, such as the Internet, and acting as a firewall. Link 84 transmits data between node 30 and other networks. Nodes 30, 44, 46 and 48 are routers, accepting traffic and routing the traffic to destinations, or to other nodes which then forward the traffic to destinations. Nodes 32, 34, 38, 40, 50, 52, 54, and 56 are PCs, supporting applications and providing functionality to users, such as word processing functionality. Node 36 is a file server, storing files and allowing other nodes access to the files; node 36 has some routing capability. Nodes 30 and 44 support management console applications. Management console application 9, supported by node 30, is depicted in FIG. 1; for the sake of clarity the management console application on node 44 is not depicted. While nodes having certain definitions and functions are depicted, the nodes of network 4 may be any devices, for example, workstations.

Nodes 30, 36, 44, 46, 48, 50 and 54 maintain proactive environments 100, 200, 202, 204, 206, 208 and 210, respectively. Each node on which agents may execute maintains a proactive environment. In an exemplary embodiment of the present invention all devices which are involved in network functions (e.g., routers, firewalls, management devices) and which may support a proactive environment do so (some devices on a network may not have the ability to support a proactive environment). Some devices not involved in network functions, such as PCs providing user functionality, may also support proactive environments.

Nodes 30–56 may communicate using the physical network (i.e., links 60–96 and nodes 30–56) and various layers of protocols. Similarly, objects, such as agents and proactive environments, and applications, may communicate using the network and various protocols. Such methods are well known in the networking art.

Each proactive environment on network 4 creates agents, provides an operating environment for agents, allows agents to migrate among devices in network 4, monitors and controls agents, and provides agents access at each device to a certain set of resources. An agent existing on a proactive environment on one node of network 4 may move to a proactive environment on another node. For example, an agent running on device 36 may move, via link 66, to device 44.

In an exemplary embodiment an agent is instantiated by a proactive environment using the Java™ language "new" keyword; a variable referencing the agent is returned to the proactive environment. A typical JVM allows certain Java™ objects to execute in a "sandbox," and does not allow these objects to have access to resources outside the sandbox. Agents, Java™ objects running inside the sandbox, may access resources outside the Java™ sandbox through services. Services are Java™ classes which may be instantiated as objects; the objects contain methods which accept various inputs and allow access to resources outside the sandbox. Services may allow access to resources or may emulate the function of resources. For example, a service altering a routing table may accept the routing table entry to be altered. A service running an MS-DOS or machine code program may accept the program; the service emulates the program in the Java™ language. Network security is provided, as agents require permissioning to use services, and services may constrain access to resources.

In an exemplary embodiment each proactive environment has a unique name, a string formed by the internet protocol ("IP") address of the device on which the proactive environment executes combined with a certain port number which is assigned for the use of proactive environments on the network. Each instantiated agent may be referred to initially by the local variable used to refer to the object when it is created. Each agent may be referred to globally by its agent name. An agent name is a string maintained by a proactive environment for each agent running on that proactive environment. The string uniquely identifies an agent by combining the name of the launch point, the type of the agent (which corresponds to the function of the agent), and, optionally, a random number. An agent type may be assigned by, for example, the creator of the agent, based on the particular functionality of the agent. An entity, such as an agent or a proactive environment, may query a proactive environment for a list of agents currently running on that proactive environment; a list of strings of agent names is returned. A proactive environment may also be queried to convert the name of an agent into a variable which may be used to refer to that agent. An agent may be referred to (e.g., as an input to a method) alternatively by a variable which represents it or its string name. Alternate embodiments may use other systems to uniquely refer to agents and proactive environments.

In an exemplary embodiment proactive environments and agents communicate within a device or across a network using a service which transmits messages. The service uses a remote procedure call ("RPC") system, defined by the Voyager™ system. Entities such as agents or proactive environments may use a messaging service to communicate with other entities. The service accepts as inputs the name of the entity (e.g., an agent or proactive environment) which is to receive the message, in the form of a variable or string, and the message. The service may operate in blocking mode, where the entity transmitting the message is halted until a reply is sent from the receiving entity, or may operate in non-blocking mode, where the transmitting entity may function immediately after sending. Messaging techniques using RPC methods are known. In alternate embodiments messaging may be provided in other ways or by other systems; for example, the messaging service may be developed in Java™ not using the Voyager™ system.

III. Agents

In an exemplary embodiment of the present invention agents are mobile Java™ objects which run within a proactive environment. Proactive environments may be hosted on devices running a JVM. A base "agent" object class provides the agent with basic functionality, such as the ability to migrate from device to device, permissioning capability, the ability to communicate with proactive environments and other agents, and the ability to use services. Additional capabilities may be provided by creating subclasses of the agent base class. Each type of agent is given unique functionality in addition to the functionality provided by a base class or an enhanced base subclass (e.g., the ability to function as a firewall) by adding a work object (a Java™ object) and possibly one or more worksheets (objects containing Java™ language code or code in another language). A subclass of the agent base class includes methods to add a work object and worksheets to instantiated agents.

When an agent begins execution at a device, a controlling method (the first method to be started when an agent is invoked) executes the work object; the work object may invoke a worksheet. A work object may invoke a different worksheet at each device or may invoke the same worksheet at each device. A work object may have only one worksheet available, and thus may not make a choice based on a current device, or may not use worksheets. In an exemplary embodiment worksheets are objects which are members of an agent. A worksheet may be a Java™ language worksheet or a non-Java™ language worksheet, which is an object containing code executed by a service. A work object invokes a non-Java™ language worksheet by passing the object to a service, which emulates the running of the worksheet in the language of the worksheet. A Java™ worksheet is executed by calling the worksheet. Creating a base class and enhancing its features with additional functionality by creating subclasses is well known in the Java™ language and object oriented programming arts.

After an agent is instantiated, a work object and worksheets which provide unique functionality may be added to the agent by invoking a method which is a member of the agent. The method is passed the work object and worksheets.

In an alternate embodiment each type of agent is given unique additional functionality by adding class members (methods and variables) to the base agent class definition; each type of agent is a subclass of the agent base class. Alternate embodiments may provide different methods for varying functionality of agents. For example, work objects and worksheets may be created using different methods, or may not be used.

Referring to FIG. 3, an agent according to an exemplary embodiment of the present invention is capable of executing on a proactive environment installed on one node of network 4 (such as node 30), stopping execution, transporting itself along with state information to a proactive environment on another node of network 4, and resuming execution. In an exemplary embodiment the state includes information contained in members of the agent, such as data, a work object, work sheets, and an access control list. However, in alternate embodiments an agent's state may include any data created when an agent is instantiated or after an agent is instantiated, for example associated information stored as agent members, or the point at which the agent stopped execution, possibly in the form of an instruction pointer.

An agent may decide to move, for example, if it is tracking a source of traffic and is attempting to move to the source. An agent may also receive an external command to move from, for example, a management console application; the agent may receive a move message.

In an exemplary embodiment of the present invention, an agent moves by invoking a method of the agent, defined in the agent base class, which accepts a location (in the form of a string) referring to a destination proactive environment. The move method calls a proactive environment "move" method. The proactive environment in turn moves the agent object by halting the agent and transmitting its code and data via the network to the target proactive environment. The proactive environment uses Java™ serialization to serialize the agent, storing all agent member variables in a file or in RAM. This data is transmitted to the destination proactive environment along with the agents's code, in the form of a Java™ class file. The data is encrypted before it is sent and decrypted by the receiving proactive environment. The receiving proactive environment uses Java™ methods to load the agent based on the class file, and instantiate the agent's members based on the received agent data. The receiving proactive environment determines from the agent's access control list if the agent has permission to execute. If so, the proactive environment starts executing the agent by calling the agent's controlling method. The controlling method queries the proactive environment for the proactive environment's name and executes the work object. Based on this name, the work object determines which worksheet is to be invoked, and invokes this worksheet. Alternately, the work object may start a worksheet without choosing among worksheets, or may function without a worksheet.

It is well known to serialize an object in the Java™ language. Methods of transmitting data across a network from one entity, residing on a device, to another entity, residing on another device, are also known. Alternate embodiments may provide other methods of moving an agent; for example, the exact point at which an agent halts may be recorded, or different modules may be responsible for the move functionality.

In an exemplary embodiment, an agent executes inside the Java™ sandbox, and thus does not have direct access to the full range of resources provided by a device. For example, an object executing inside the sandbox may not access the format command to alter the hard disk drive 32. This provides security, in that rogue objects (e.g., rogue agents) cannot harm the device or network; this also limits the usefulness of such objects. According to an embodiment of the present invention, agents may access resources outside the sandbox via services. While an embodiment of the present invention is described with respect to an agent running in a sandbox, other embodiments of the present invention, allowing for modules to access restricted resources, may allow for controlled access to resources by any modules, whether restricted by a sandbox model or not. For example, the system and method of the present invention may allow access to resources which are generally restricted to most objects, as opposed to only objects running in a sandbox type structure.

Figure 4:
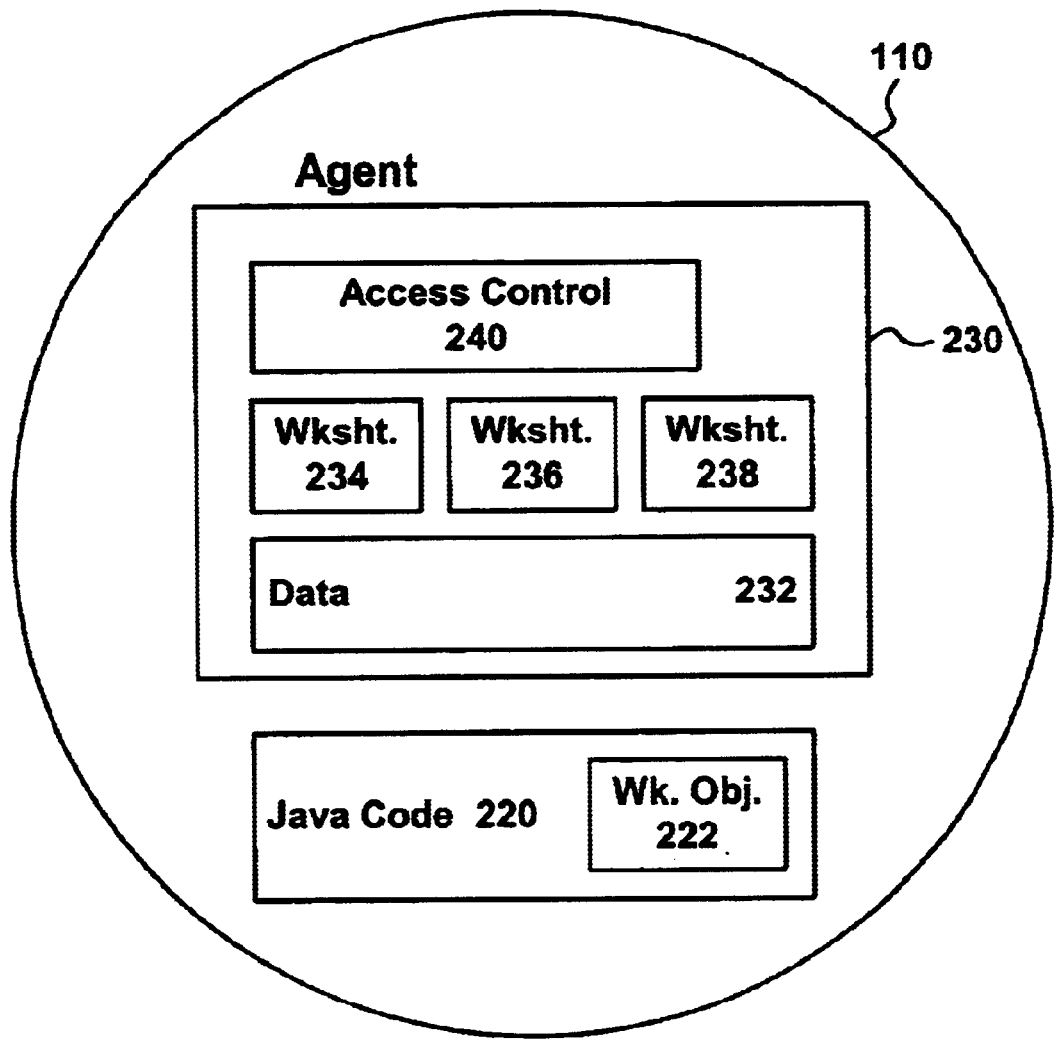
FIG. 4 is a block diagram illustrating an instantiated agent of FIG. 1 according to an embodiment of the present invention.

FIG. 4 is a block diagram illustrating instantiated agent 110 of FIG. 1 according to an embodiment of the present invention. In an exemplary embodiment agent 110 includes code segment 220, which is comprised of Java™ methods which are members of agent 110 and which provide functionality to agent 110, and state 230. Code segment 220 includes work object 222 providing functionality to agent 110. State 230 includes access control list 240, a list determining, for agent 110, which services may be used on which devices, how those services may be used, and on which devices agent 110 may be run. State 230 includes worksheets 234, 236 and 238; work object 222 may use worksheets 234–38 to provide functionality to agent 110. Worksheets 234–38 are members of agent 110 which may be Java™ or non-Java™ language code segments. State 230 includes data segment 232, which contains run time data agent 110 may have instantiated. Access control list 240, data 232 and worksheets 234–38 are variables which are members of agent 110. A variable may represent an object, as in the case of work objects. Code segment 220 includes a controlling method, the first method invoked when agent 110 is started on a device. Access control list 240 lists devices on which agent 110 may execute, and for each device the services and, in some cases, capabilities within services, which agent 110 may use on that device. Agent 110 may only execute on the devices listed in access control list 240. Alternate embodiments may provide other methods and structures for recording permissioning of agents. Alternate embodiments may provide a different structure for agents.

In an exemplary embodiment, to ensure the integrity and source of agent 110 it is encrypted using a digital signature when it is transmitted across the network by a transmitting proactive environment. Only entities knowing the digital signature may decrypt, access and execute agent 110. Encryption and verification methods are well known. Alternate embodiments may provide other methods for encrypting or protecting agents data.

Figure 5:
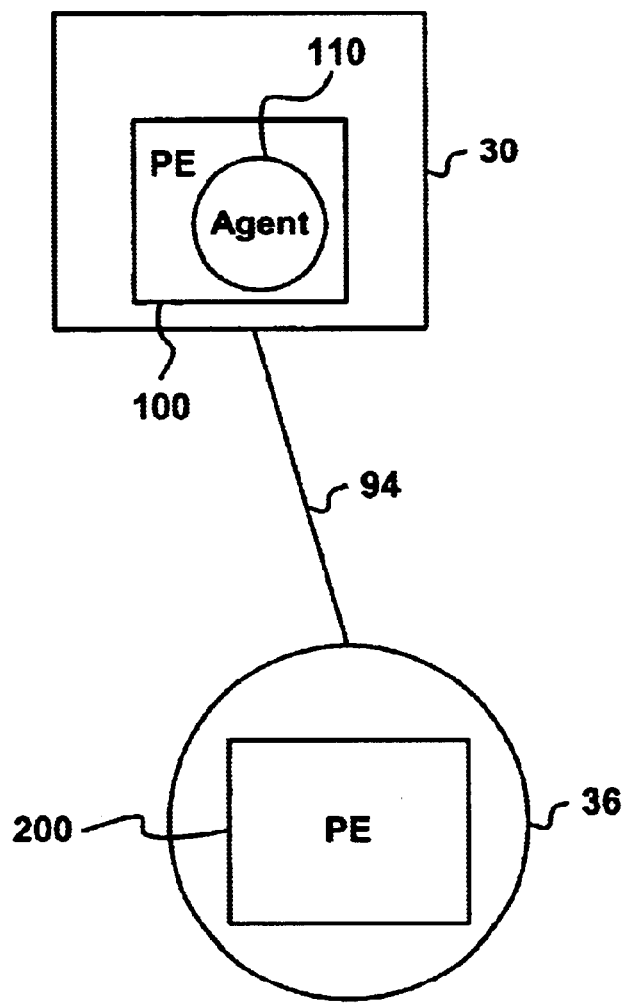
FIG. 5 is a block diagram illustrating a portion of the network of FIG. 3 according to an embodiment of the present invention.

FIG. 5 is a block diagram illustrating a portion of network 4 of FIG. 3 according to an embodiment of the present invention. FIGS. 3 and 5 illustrate network 4 from different aspects; thus like numbered components are identical in function and structure. Agent 110 executes on proactive environment 100, which in turn is executing on device 30. Link 94 connects device 30 to device 36. Device 36 supports proactive environment 200. Agent 110 may move to other devices via network 4.

Figure 6:
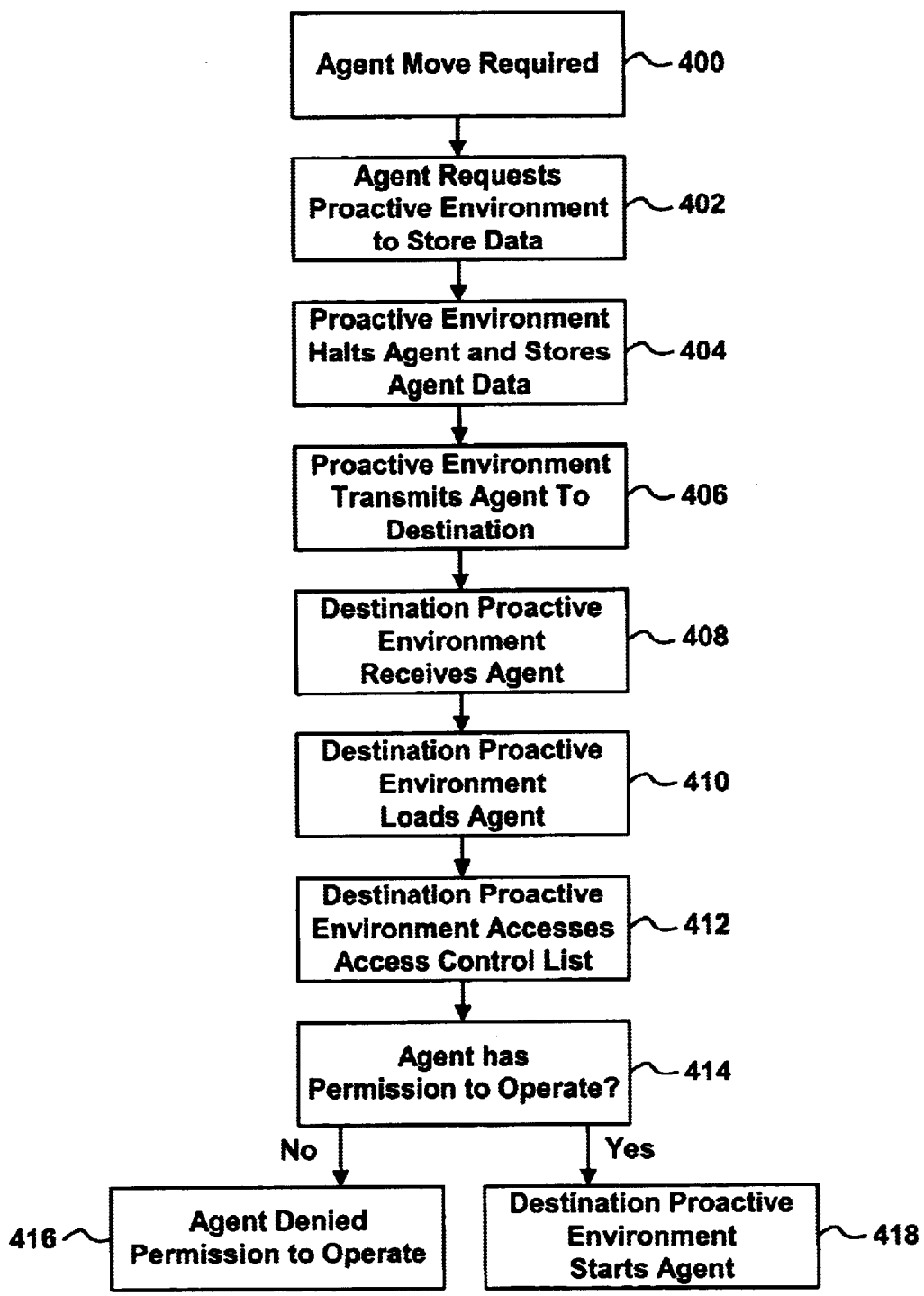
FIG. 6 is a flow chart illustrating the move operation of the agent of FIG. 5 according to an embodiment of the present invention.

FIG. 6 is a flow chart illustrating the move operation of agent 110 of FIG. 5 according to an embodiment of the present invention. While specific steps are described to enable an agent to move, other embodiments may use other steps and sequences of steps without affecting the overall operation or benefits of the present invention.

Referring to FIGS. 5 and 6, in step 400 agent 110 decides to move, either as a result of an internal decision or after receiving a message from, for example, its launch point.

In step 402, agent 110 requests proactive environment 100 to move agent; agent 110 calls a method of agent 110, defined in the agent base class, which accepts a location (in the form of a string) referring to proactive environment 200, the destination of agent 110. Proactive environment 100 is operating on device 30. This method, in turn, calls a "move" method which is a member of proactive environment 100, on which agent 110 is currently running.

In step 404, proactive environment 100 stores agent data. Proactive environment 100, using the move method, halts agent 110 and serializes agent 110, storing all agent members variables in a file or in RAM.

In step 406, proactive environment 100, using the move method, transmits agent 110 to proactive environment 200. All transmitted information is encrypted before transmission. Code 220 and state 230 of agent 110 are moved across network 4 from device 30 to device 36 via link 94. State 230 of agent 110 is transmitted as a buffer of bytes. Code 220 of agent 110 is transmitted in the form of a Java™ class file. Alternate embodiments may use other methods to transmit agent data between devices; for example, if code is duplicated across devices, the code segment need not be transmitted.

In step 408, proactive environment 200 receives the files constituting agent 110 and decrypts the agent information.

In step 410, proactive environment 200 loads agent 110 based on the class file and instantiates members of agent 110 based on received agent data.

Instep 412, proactive environment 200 accesses access control list 240 of agent 110.

In step 414, proactive environment 200 uses access control list 240 to determine if agent 110 has permission to operate on proactive environment 200. If agent 110 does not have permission, proactive environment 200 proceeds to step 416. If agent 110 does have permission, proactive environment 200 proceeds to step 418.

In step 416, agent 110 is denied permission to operate on proactive environment 200. The proactive environment which launched agent 110 is informed that agent 110 was denied permission; if the proactive environment launched agent 110 due to a command from another application (e.g., a management console application) the proactive environment may inform that application. The proactive environment or the application which initiated the launching of agent 110 may reconsider the tasks or locations for agent 110.

In step 418, proactive environment 200 starts agent 110 executing. Proactive environment 200 calls the controlling method of agent 110. The controlling method queries proactive environment 200 for the proactive environment's name. Based on this name, work object 222 determines which of worksheets 234–38 is to be invoked, and invokes this worksheet.

Agents may take autonomous action based on their own data gathering, possibly after communicating with each other using a messaging service. For example, several agents distributed throughout a network may sniff for network traffic to diagnose a high traffic condition. The agents may decide, without the intervention of a management console application, to alter a firewall table to prevent a specific type of traffic from entering and disrupting the network. The agents may make such a decision by being programmed to categorize traffic by factors such as type, source and destination, to determine which category of traffic occurs at a level disruptive to the network, and to alter a firewall table to block this category of traffic.

That agents can take action without being directed by or consulting with a management console application or its human operator allows for fast response to network conditions. Furthermore, during a network failure or network congestion which prevents or disrupts communication between an agent and a management console application, the agents can continue to function and solve network problems. That trusted agents can, with the proper permissioning, alter network settings, allows for this flexible and autonomous operation. That services allow agents to interface with a variety of applications (such as routers) on a variety of devices allows agents to perform operations, such as router table modifications, in a flexible and autonomous manner across numerous network nodes.

IV. Services

In an exemplary embodiment of the present invention each resource accessible by agents is accessible by a type of service. Services are member classes defining objects which contain methods accepting inputs from agents and allowing agents access to resources. The objects are Java™ objects running on the JVM. When used herein, a service class, a service object, and a method which is a member of that service object may all be referred to as a service. Services, if so created, may have access to any resource on a device or network to which the JVM supporting the service has access, e.g., file creation, SNMP messages, routing tables, display output. Each type of service provides access to a different resource in a different manner, and interfaces with agents in a different manner. Within a service type, different methods may exist allowing access to different implementations of the resource. For example, a router service type may have one instantiation on a device produced by a first manufacturer and another instantiation on device produced by a second manufacturer. The router tables on each device may have different structures. The service methods provided by the instantiation of the service on the first device provide the same agent interface as those provided by instantiation of the service on the second device, and the service methods on each device map to the different router tables on those devices.

Agents operate inside the sandbox, but to be of practical use agents require access to resources outside the sandbox. Services allow agents access to resources outside the sandbox in a circumscribed manner; this may be tailored according to permissioning. Current systems providing mobile agents do not allow the agents to participate effectively in network management or act as user applications, as the agents are either highly restricted in their use of network and device resources or allowed unfettered access to these resources; controlled and permissioned access is not provided.

Services may emulate the execution of programs in a given language on a given device; for example, a service may accept and execute an MS-DOS program written in the machine code of a particular device. In this manner services may execute worksheets not developed in the Java™ language. Creating a Java™ program which emulates a given computer language is well known in the art. In alternate embodiments services may provide sets of functionality other than resource access and emulation; for example, services may provide basic agent functionality, such as move functionality, or may provide other non-resource functionality, such as data gathering or storage.

In an exemplary embodiment, the agents and services of the present invention are created so that each type of service is accessed by all agents in a manner standard to that service type. Thus services grant access to resource in a device, platform, and application independent manner. A service providing access to a type of resource provides one standard interface to agents, despite that the underlying resources may provide greatly varying interfaces. Services thus provide a unified view of resources. For example, a service providing access to file systems on devices provides one interface and view for the file system, despite that the underlying devices on which the service sits may have varying methods of accessing their file systems. A file system type service on an PC may access the PC's file system differently from a file system type service on a Unix machine; however, both services provide the same interface to agents. An agent may access files while on the first device, move to the second device and access files, and is able to call the same services on each device using the same interfaces. Current systems are inflexible in that agents must access resources on different devices with different interfaces. For each service type, a different service class is created for each device or platform supported; the methods in each class are written to interface with the device or platform. The agent interface for each service method within a service type is the same.

In an exemplary embodiment an agent calling a service makes a request for the service to the proactive environment on which the agent runs. The proactive environment accesses the agent's access control list to determine if, and to what extent, the agent may access the service. The proactive environment creates an object which is an instance of the service. If the service may be created to provide various levels of capabilities based on permissioning, variables, members of the service object, are set to indicate which aspects of the service the agent may access; this is done per the agent's access control list. Instantiated services provide methods which accept inputs from agents and may return output to agents. Each type of service provides access to a different resource in a different manner, and interfaces with agents in a different manner. The service methods provide access to resources only if the associated variables, indicating permissioning, are properly set. The object is passed to the agent, which may call methods of the object to access the underlying resources. Alternate embodiments may provide other systems for accessing services, and may provide other structures for services. For example, services may be integral to agents, or may be defined or accessed without the aid of a proactive environment.

A service method may pass data back to a calling agent as a return value, in the manner typical of method or function calls. If a continuous or asynchronous stream of data from the service is desired the agent registers as an event listener with the service method; when the service needs to pass data to the agent it notifies the agent via an event. In alternate embodiments other methods of passing data from a service to an agent may be used; for example, a callback function may be passed to the service. Event handling, and passing data to a calling procedure via a return value or an event or callback, are well known.

In an exemplary embodiment of the present invention certain services may only be accessed by agents which have the proper permissioning. For each service on a device requiring permissioning, an agent accessing that service must have permission to use that service on that device. Permissioning may also allow a proactive environment to tailor services to agents. For example, a service allowing access to SNMP messages, when called by an agent with one set of permissions, may allow that agent to read and write to a device using SNMP messages. When an agent with different permissioning calls that service, it may be configured to allow that agent only the ability to read using SNMP messages. Each agent object, not each agent type or class, is given its own set of permissioning. Some services may not be restricted, and are thus available to agents without permissioning. For example, a service outputting data to a display may not be restricted. When an agent executing on a proactive environment requests a service by calling a service method, the proactive environment accesses the agent's access control list to determine if the agent has permission to run that service on the device.

Services may provide circumscribed, altered or limited access to resources, separate from tailoring resulting from permissioning. For example, agents may be permitted to access files, but not files devoted proactive environments, operating systems or other sensitive functions. In such a manner, a service may provide access to a resource or a subset of the resource.

In one embodiment of the present invention services may grant access to devices which do not support a proactive environment. Certain devices, such as legacy devices using outdated technology, may be unable to support a proactive environment. A proxy device, a device which can support a proactive environment, may allow an agent access to the legacy device. An agent may manage device via services which are provided on a proxy device which can be used to monitor or control the managed device via, for example, SNMP or Command Line Interface ("CLI"). For example, using SNMP, an agent on a proxy device may manipulate a routing table on a managed device. The agent may transmit commands to or receive data from the managed device via the network and services. An agent may access services to manipulate proxy devices without distinguishing between a proxy device and another device supporting a proactive environment. For each proxy service type, a different service method is created for each device or platform supported; the agent interface for each service method within a proxy service type is the same. In current systems agents may not manage remote devices; agents are not allowed permissioned access to resources on devices other than that on which they are operating. The system and method of the present invention, shielding underlying resources from agents and providing a standardized interface via a service, allows an agent to access a device supporting a proactive environment and a managed device with equal ease. A unified view of underlying devices and resources is provided to agents.

Figure 7:
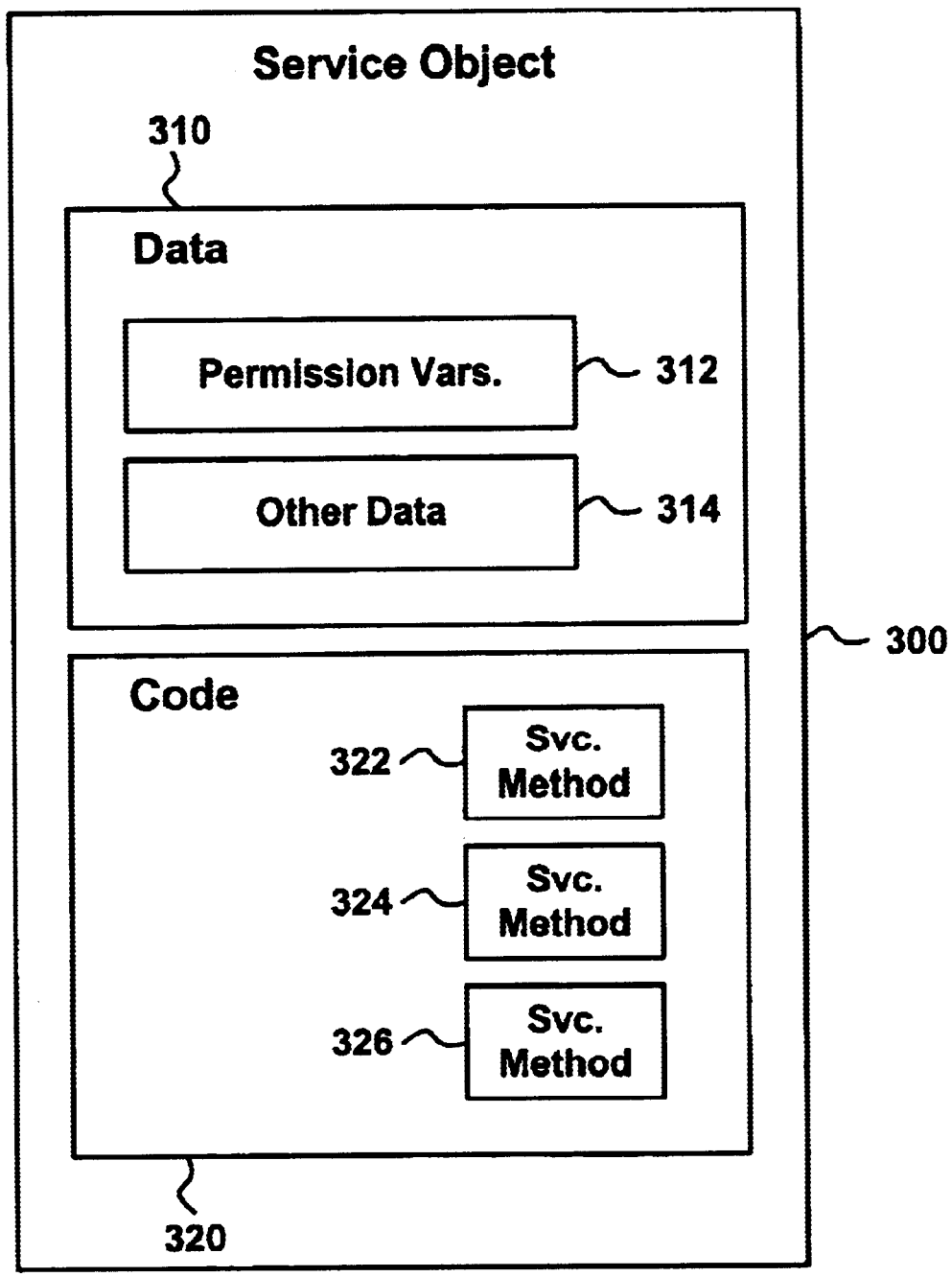
FIG. 7 is a block diagram illustrating a service object instantiated from a service of FIG. 1 according to an embodiment of the present invention.

FIG. 7 is a block diagram illustrating a service object instantiated from service 102 of FIG. 1 according to an embodiment of the present invention. Service object 300 is a Java™ object instantiated from service 102, a class defining a Java™ object. Service object 300 is instantiated for one agent, and allows that agent access to a resource. Service object 300 includes data segment 310 and code segment 320. Data segment 310 includes permission variables 312, members of service object 300 which indicate which methods an agent may access and thus to what extent an agent may access the underlying resource. Data segment 310 includes other data 314, which may be necessary for the operation of service object 300. Service object 300 includes code segment 320, which includes methods 322, 324 and 326, allowing agent access to aspects of the underlying resource.

Figure 8:
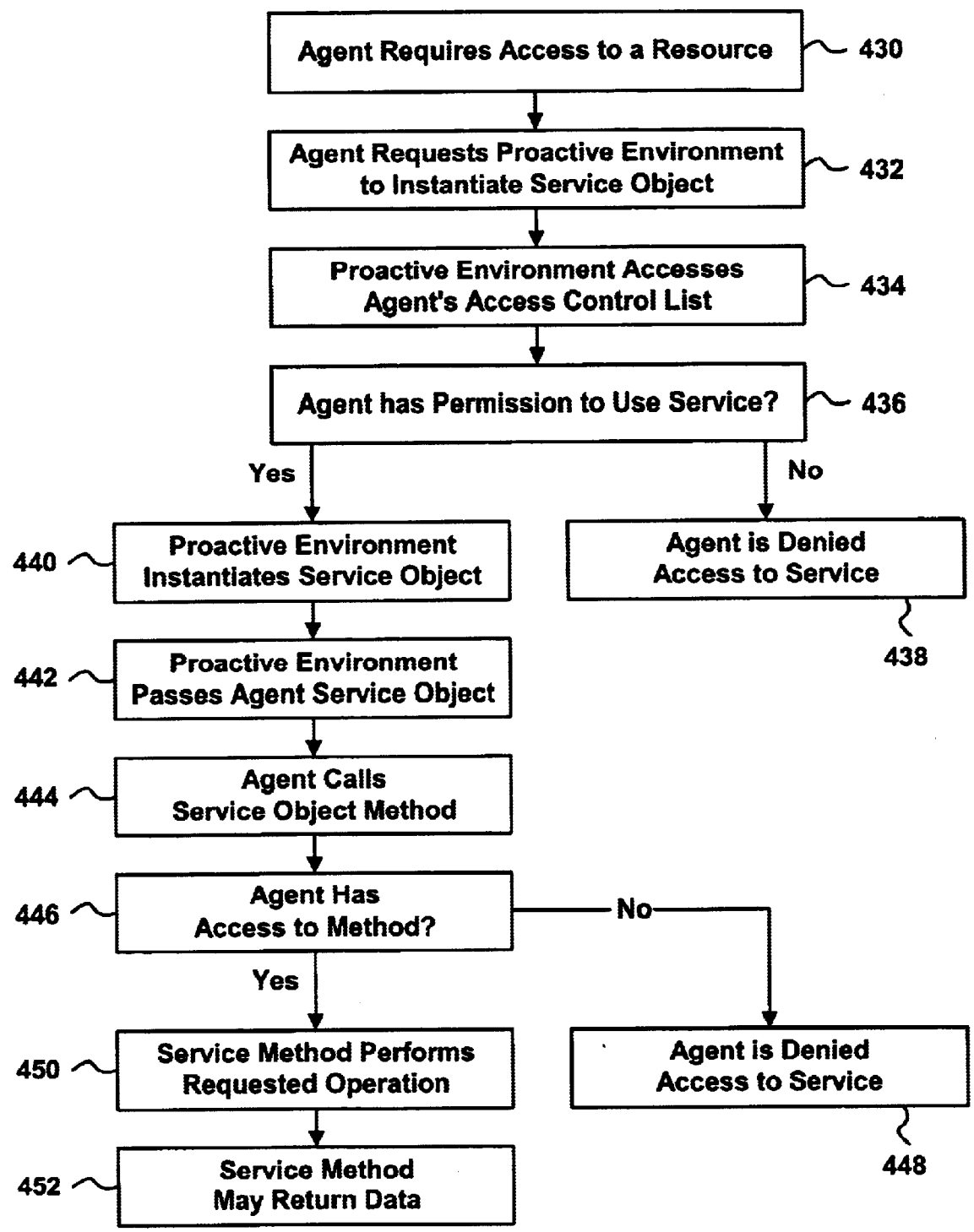
FIG. 8 is a flow chart illustrating the interaction between an agent and a service of FIG. 1 according to an embodiment of the present invention.

FIG. 8 is a flow chart illustrating the interaction between agent 110 and service 102 of FIG. 1 according to an embodiment of the present invention. While specific steps are described to enable an agent to access a service, other embodiments may use other steps and sequences of steps without affecting the overall operation or benefits of the present invention.

Referring to FIGS. 2, 7 and 8, in step 430 agent 110 requires access to a resource. For example, agent 110 requires access to a file stored on hard disk drive 132 on device 30. Service 102 permits agents limited access to hard disk drive 132, according to an agent's permissioning.

In step 432 agent 110 requests proactive environment 100 to instantiate an object defined by service 102.

In step 434, proactive environment 100 uses methods to read access control list 240 of agent 110.

In step 436, proactive environment 100 uses access control list 240 to determine if agent 110 has permission to use service 102 on device 30. If agent 110 does not have permission, proactive environment 100 proceeds to step 438. If agent 110 does have permission, proactive environment 100 proceeds to step 440.

In step 438, agent 110 is denied access to service 102.

In step 440, proactive environment 100 instantiates service object 300 based on the class of service 102. Proactive environment 100 configures service object 300 per the permissioning accessed in step 434. For example, one set of permissioning may allow agent 110 to use service object 300 to write to and read from hard disk drive 132, and another set of permissioning may allow agent 110 to use service object 300 only to read from hard disk drive 132. Proactive environment 100 sets permission variables 312, members of service object 300, to indicate which aspects of service 102 (in the form of methods 322–326 of service object 300) agent 110 may access. In alternate embodiments, services may not be objects instantiated on a per-use basis.

In step 442, proactive environment 100 passes agent 110 service object 300.

In step 444, agent 110 uses service object 300 by calling a method of methods 322–326. For example, if agent 110 calls a file read method, requesting service 102 to allow agent 110 to read a file on hard disk drive 132, agent 110 passes the service method inputs describing the file requested.

In step 446, the called method determines if agent 110 has access to the particular method requested. Agent 110 accesses permission variables 312. If agent 110 has access to the method, the method proceeds to step 450. If agent 110 does not have access to the method, the method proceeds to step 448.

In step 448, agent 110 is denied access to service 102.

In step 450 the service method performs the operation requested by agent 110. For example, the method reads the requested file on hard disk drive 132. Service methods 322–26 are Java™ methods providing access to device 30 and network 4, via JVM 3 and OS 5; the methods are not restricted by the sandbox model.

In step 452 the requested service method may return requested data to agent 110. For example, in the case of a file read, the service method returns the data as the return value results of a function call.

V. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention.

What is claimed is:

1. A computer system for allowing agents to function on a set of devices, each device having a set of resources, the system comprising:
   a set of agents;
   for each device, an environment allowing agents to operate; and
   for each device, a set of services, each service allowing access by an agent to a resource, each agent having an associated permission list indicating which service the agent may access where each service provides a standardized interface to each agent;
   where each agent may move from an environment on one device to an environment on another device.

2. The system of claim 1 where each service provides access to or emulates a subset of the resource associated with the service.

3. The system of claim 1 where each service provides access to or emulates a subset of the resource associated with the service depending on an entry in the agent's permission list.

4. The system of claim 1 where, when an agent moves from an environment on one device to an environment on another device, the state of the agent moves with the agent.

5. The system of claim 4 where, when an agent requires access to a service, an object is created associated with the service and the object is passed to the agent.

6. The system of claim 1 where:
   each resource is of a certain resource type;
   each service corresponds to a certain service type;
   each service type corresponds to a resource type; and
   each service within a service type provides an identical interface to agents.

7. The system of claim 1 where each agent includes at least:
   a code segment; and
   a state; where the state is maintained as the agent moves from a first device to a second device.

8. The system of claim 7 where a subset of the set of agents may perform network management functions.

9. The system of claim 7 where a subset of the set of agents may act as a user application.

10. The system of claim 7 where each agent in a subset of the set of agents may access a resource on a device other than which the agent is currently executing.

11. A method for allowing a mobile software agent to access a resource on a device in a set of devices, each device in the set of devices having a set of resources, the method comprising:

the agent calling a service on the device;

determining if the agent has permission to access the resource; and if the agent has permission to access to the resource, the agent invoking the service associated with the resource, and the service accessing the resource where each service provides a standardized interface to each agent.

12. The method of claim 11 where each agent may move from a first device in the set of devices to a second device in the set of devices.

13. The method of claim 12, further comprising:

creating an object associated with a service;

passing the object to the agent; and the agent calling the service by accessing the object.

14. The method of claim 12 where, when an agent moves, a code segment, data segment, and permission list associated with the agent is moved.

15. The method of claim 11 where each agent has an associated permission list indicating which service the agent may access.

16. The method of claim 11 where:

each service provides access to a subset of the resource associated with the service; and each service may provide access to the resource by emulating the resource.

17. The method of claim 16 where each service provides access to a subset of the resource associated with the service depending on an entry in a permission list associated with the agent.

18. The method of claim 11 where each agent in a subset of the set of agents may access a resource on a device other than which the agent is currently executing.

19. The method of claim 11 where the agent may perform network management functions.

20. The method of claim 11 where the agent may act as a user application.

21. A set of instructions residing in a storage medium, said set of instructions capable of being executed by a processor to implement a method for extracting information from a file, the method comprising:

allowing the agent to call a service on the device;

determining if the agent has permission to access the resource; and if the agent has permission to access to the resource, allowing the agent to invoke the service associated with the resource, and allowing the service to access the resource where each service provides a standardized interface to each agent.

22. The method of claim 21 where the plurality of instructions further comprises:

defining, for each agent, an associated permission list indicating which service the agent may access.

* * * * *